United States Patent [19]

Schotz

[11] Patent Number: 4,829,570
[45] Date of Patent: May 9, 1989

[54] WIRELESS REMOTE SPEAKER SYSTEM

[75] Inventor: Larry Schotz, Cedarburg, Wis.

[73] Assignee: Recoton Corporation, Long Island City, N.Y.

[21] Appl. No.: 53,355

[22] Filed: May 22, 1987

[51] Int. Cl.⁴ .............................................. H04H 5/00
[52] U.S. Cl. ........................................ 381/3; 381/13; 340/310 R; 455/3; 455/63; 455/72
[58] Field of Search .......................... 381/1, 2, 3, 4, 13; 455/72, 59, 103; 340/310 A, 310 R, 310 CP

[56] References Cited

U.S. PATENT DOCUMENTS

| | | | |
|---|---|---|---|
| 2,932,794 | 4/1960 | Crow | 328/137 |
| 3,369,078 | 2/1968 | Stradley | 381/2 |
| 3,400,221 | 9/1968 | Wolters | 455/3 |
| 4,207,527 | 6/1980 | Abt | 381/14 |
| 4,398,060 | 8/1983 | Ienaka et al. | 381/4 |
| 4,442,546 | 4/1984 | Ishigaki | 455/72 |
| 4,457,019 | 6/1984 | Szabo, Jr. et al. | 455/63 |
| 4,701,945 | 10/1987 | Pedigo | 379/64 |
| 4,704,726 | 11/1987 | Gibson | 381/13 |

Primary Examiner—Forester W. Isen
Attorney, Agent, or Firm—Curtis, Morris & Safford

[57] ABSTRACT

A device comprised of separate transmitter and receiver sections, which converts an audio signal into an F.M. signal, transmits the F.M. signal over A.C. power lines, and reconverts the F.M. signal into an audio signal, which can then be outputted to loudspeakers or other devices. By transmitting the signal over A.C. lines, no long wires are needed to connect remote loudspeakers or other devices to the source of the audio signal.

12 Claims, 2 Drawing Sheets

WIRELESS REMOTE SPEAKER SYSTEM

BACKGROUND OF INVENTION

This invention relates to the communication of audio signals over A.C. power and wiring lines and, more particularly, to a so-called wireless remote system by which stereophonic signals may be transmitted from, for example, hi-fidelity audio equipment to loudspeakers.

The technique of using the A.C. wiring system in a home or office to serve as the transmission medium for audio signals has long been used. One application of this technology is the widely available wireless intercom system which allows individuals in different rooms of a house to converse with one another. Unfortunately, conventional wireless intercom systems have met with less than enthusiastic acceptance.

Typical wireless intercom systems rely on A.M. transmitting and receiving principles and, consequently, are susceptible to electromagnetic noise which degrades the audio signal. The A.C. power lines in most households are subjected to electromagnetic noise from many sources. It is common, therefore, for the A.M. signals transmitted over such lines to be so degraded that the information contained therein is not comprehensible when received. While careful design considerations in wireless intercoms might succeed in overcoming this difficulty, presently available intercom devices tend to be inexpensively constructed and/or designed. Noise reducing circuits, if present, usually fail to provide adequate noise immunity.

With these problems in mind, it is readily apparent that existing wireless intercom techniques cannot be turned to account for the transmission of high fidelity audio signals through household A.C. power lines.

OBJECTS OF THE INVENTION

It is one object of the present invention to provide an F.M. communication system for transmitting and/or receiving hi-fidelity audio signals, such as stereophonic signals over A.C. power lines, while avoiding degradation or loss of information in those signals.

A further object of this invention is to provide a wireless communication system which operates in a true stereo mode, using non-harmonically related carrier frequencies for the respective signal channels.

Another object of this invention is to prevent A.M. interference in a wireless communication system due to carrier frequency harmonics by transmitting a pure sine wave, instead of a square wave.

A further object of this invention is to provide a wireless remote speaker system which transmits and receives the full dynamic range of audio sources such as, for example, compact disc players, tape record/playback devices, and phonographs.

A further object of this invention is to warn the user of a wireless communication system about operating the audio transmitter in an overmodulating mode, which would otherwise lead to distortion of the audio signal.

A further object of this invention is to disconnect the remote output devices in a wireless communication system when no audio signal is received over that system.

Another object of this invention is to provide a compatible transmitter and receiver in a wireless communication system which will operate properly without the need for periodic tuning or adjustment.

Another object of this invention is to provide a wireless transmission system for use over A.C. power lines having selectable transmission frequencies to prevent possible interference with other wireless units operating on the same A.C. lines.

Further objects and advantages of the invention will be apparent from the ensuing detailed description of a preferred embodiment thereof, and the novel features will be particularly pointed out in the appended claims.

SUMMARY OF THE INVENTION

In accordance with this invention, a transmitter and receiver are provided; the transmitter accepting audio input signals, modulating the audio signals using F.M. principles and transmitting the F.M. signals over A.C. power wiring and the receiver receiving the F.M. signals, amplifying and filtering the F.M. signals, demodulating the F.M. signals into audio signals and outputting the audio signals.

In accordance with one aspect of this invention, the transmitter and receiver transmit and receive stereophonic signals. The transmitter accepts stereophonic audio inputs and modulates the audio signals on different carrier frequencies. The receiver receives the different carrier frequencies, demodulates them, and outputs stereophonic audio signals.

In accordance with another aspect of this invention, the transmitter is provided with an audio signal compressor and the receiver is provided with an audio signal expander. The compressor reduces the dynamic range of the transmitted audio signals and the expander increases the dynamic range of the received audio signals. Using these devices enables the transmitter and receiver to transmit and receive audio signals with very wide dynamic ranges, such as might be provided by a compact disc player, without requiring a large bandwidth signal.

In accordance with yet another aspect of this invention, the receiver has a muting circuit which automatically disconnects any output device currently coupled to the receiver if no audio signals are present.

In accordance with yet another aspect of this invention, the transmitter has an overmodulation protection circuit which provides a visual indication when the voltage level of the audio input signal is too large.

BRIEF DESCRIPTION OF THE DRAWINGS

The following detailed description, given by way of example, and not intended to limit the present invention solely to the embodiments shown and described herein, will best be understood in conjunction with the accompanying drawings in which.

DETAILED DESCRIPTION OF PREFERRED EMBODIMENTS

To best understand the advantages attained by the present invention, it is described herein in the environment of a remote stereophonic communication system capable of transmitting stereophonic audio signals (such as left-channel and right-channel signals) from a source to a destination. Examples of suitable sources include stereophonic receivers and amplifiers, which in turn may be connected to various audio sources, such as a magnetic tape player (for example, a reel-to-reel tape machine or a cassette deck), a compact disc player, a phonograph, or a tuner. Now that stereophonic television broadcasting has been introduced, a television receiver may serve as a suitable source. Examples of suitable destinations include stereophonic loudspeakers or headphones, or a magnetic tape recorder (such as a reel-to-reel or cassette deck). For convenience, it will be assumed that the present invention is used to transmit audio signals over A.C. power lines to loudspeakers. However, it will be appreciated that this invention may be used in other environments such as, but not limited to, the remote recording of a transmitted conversation, or the transmission of audio signals created during a studio recording session to remote headphones.

Broadly, the present invention includes a transmitting section and a receiving section separated from each other by any desirable distance, but interconnected by way of the usual A.C. power wiring normally provided in a household, office, or the like. The transmitting and receiving sections may be disposed in different rooms of a home.

TRANSMITTER SECTION

Figure 1:
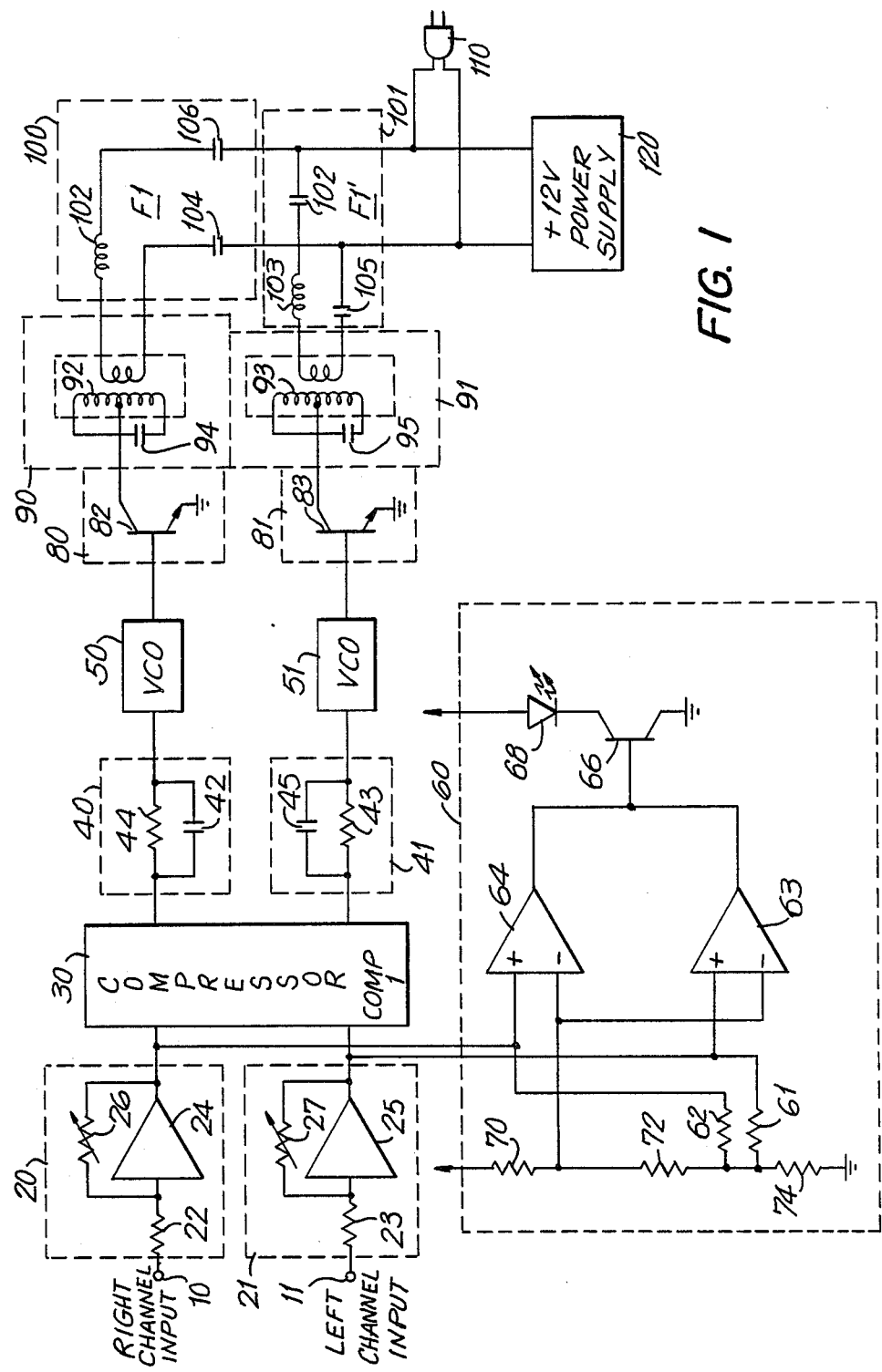
FIG. 1 is a schematic/block representation of the transmitter section of the present invention.

As shown in FIG. 1, the transmitter section of the present invention includes a pair of audio channels, such as right and left channels, comprised f input terminals 10 and 11, input buffers 20 and 21, an audio signal compressor 30, pre-emphasis networks 40 and 41, variable frequency oscillators 50 and 51, and tuned output networks 90 and 91, respectively. For convenience and simplification, elements designated by an even reference numeral are included in the right channel and elements designated by an odd reference numeral are included in the left channel. A circuit common to both channels is identified by an even reference numeral.

Input terminals 10 and 11 couple the transmitter section to a source of stereophonic audio signals. Typically, the source may include such devices as a compact disc player, a cassette deck, a phonograph or a radio tuner. The terminals themselves can be designed to accept plug-in jacks, commonly called "banana" plugs, screw fasteners, or any other conventional mechanical-/electrical connector.

Input buffers 20 and 21 are coupled to input terminals 10 and 11 via resistors 22 and 23, respectively. The buffers are adapted to amplify the input signal without increasing the load on the audio source. In the illustrated embodiment, each buffer is comprised of an amplifier 24 or 25 and a variable feedback resistor 26 or 27, the variable resistor enabling the user/operator to control the output level from the buffer by varying the gain thereof. As will be described, the desirability of gain adjustment is indicated by an indicator LED 68 in a level control warning circuit 60, whose construction and operation is described below.

Audio signal compressor 30 is coupled to the output terminals of input buffers 20 and 21 and is adapted to reduce the dynamic range of audio signals supplied thereto by the buffers. Recently developed audio signal sources such as compact disc players have a very extended dynamic range, frequently as much as 90 to 100 dB. In an F.M. transmission system, such as used by the present invention, the audio signal is converted to F.M. by either increasing or decreasing the frequency of a carrier signal. To modulate a carrier frequency using a signal with the large dynamic range of a compact disc player would require very large deviations (i.e. modulations) in carrier frequency and consequently a very large bandwidth would be needed to accommodate such frequency shifts. Both large bandwidth and large deviations pose numerous problems, such as the need for a very linear frequency modulator (preferably, a voltage controlled oscillator) to modulate the signal. Although such oscillators are available, a simpler and more price-effective solution entails the use of a compressor to reduce the total dynamic range of the audio signal.

Compressor 30 reduces the dynamic range of an audio signal to one-half its original range. In one embodiment, compressor 30 may be formed as, for example, a compressor/expander chip such as Signetics Model NE 570 N, having separate channels therein. Other conventional signal compressors may be used.

Pre-emphasis networks 40 and 41 are coupled to the respective left-channel and right-channel outputs of compressor 30. Each pre-emphasis circuit is adapted to increase the signal strength of higher frequency signals included in the compressed audio signals supplied by the compressor. It is well-known that the distorting effects of noise in a transmission system increase with increasing signal frequency. Consequently, if the proportional strength of the high frequency components of the audio signal is to be maintained, the signal strength of the high frequency signal components should be increased relative to the other frequencies. Pre-emphasis networks 40 and 41, which are comprised of capacitors 42 and 45 and resistors 44 and 43 respectively connected in parallel therewith, perform this function. As the applied signal increases in frequency, the impedance of capacitors 42 and 45 decreases. Thus, more of the higher frequency signals pass through the pre-emphasis networks, and the desired proportional signal strength increase of the higher frequencies is obtained.

Although the pre-emphasis function may be effected with other components, a resistor-capacitor network is simpler and more readily constructed.

Variable frequency oscillators 50 and 51 are coupled to pre-emphasis networks 40 and 41 and are adapted to convert an audio signal supplied thereto into an F.M. signal. In the present embodiment of the invention a voltage controlled oscillator is used to convert the signal, but any conventional frequency modulator, or even a phase modulator, could be used in alternate embodiments.

The voltage controlled oscillators used in the invention operate in a manner known to those of ordinary skill in the art to produce square wave outputs. The individual components 50 and 51 illustrated as "VCOs" may be formed as, for example, a voltage controlled oscillator chip such as National Semiconductor Model LM 566.

Tuned networks 90 and 91 are coupled to variable frequency oscillators 50 and 51 by amplifiers 80 and 81 which are adapted to increase the strength of the F.M. signal. Any type of amplifier circuit with the requisite gain at the operating frequency of the variable oscillators may be used, such as operational amplifiers. In the present embodiment, transistors 82 and 83 in common emitter configuration provide the amplification needed.

The tuned output networks are coupled to the collectors of transistors 82 and 83, respectively, and are adapted to convert the square waves produced by the variable frequency oscillators 50 and 51 to sinusoidal waves. As is known from Fourier analysis, a square wave consists of numerous harmonically related sinusoidal waves added together. By the proper selection of the inductance of transformers 92 and 93 and the capacitance of capacitors 94 and 95, which comprise the tuned output networks, each network will resonate at a respective frequency. Consequently, each network will pass only a single sinusoidal wave having a designed resonant frequency.

The secondary windings of transformers 92 and 93 of tuned networks 90 and 91 are coupled to filter circuits 100 and 101 which are adapted to pass a high frequency signal but to block low-frequency signals. By so doing, the filters, which apply the F.M. audio signals to the A.C. power lines, prevent the A.C. power signal, which is usually 60 Hz, from flowing into the transmitter. As shown, filter 100 is comprised of capacitors 104 and 106 connected in series with an inductor 102 and the secondary winding of transformer 92. Capacitors 104 and 106 serve to couple the filter to the A.C. power lines via a conventional plug 110, which may be thought of as an output terminal of the transmitter section. Filter 101 is of substantially the same construction. Although the filters have been constructed from inductors and capacitors, other methods of filter construction could be used with no alteration in function.

A power supply 120 is coupled to the A.C. power lines by plug 110 and is adapted to convert a 120 V. A.C. signal to a 12 V. D.C. supply voltage to power the previously described circuits. The power supply is of conventional construction and operation, known to those skilled in the art.

Although not shown in the present embodiment, a selector switch may be coupled to variable frequency oscillators 50 and 51 to permit the user to change operating (or carrier) frequencies. As an example, the switch may couple different resistors to the variable frequency circuits, thereby changing their basic carrier frequencies.

A level control warning circuit 60 is coupled to the output from input buffers 20 and 21 and is adapted to provide a visual warning (e.g. by means of an LED indicator lamp 68) that the signal level output from the buffers is too high. The warning circuit is comprised of resistors 61, 62, 70, 72, and 74, operational amplifiers 64 and 63, an LED 68 and a transistor 66. The operational amplifiers are configured as comparators using the resistors to establish reference voltage levels to which the signals from buffers 20 and 21 are compared. Resistors 70, 72 and 74 are connected as a voltage divider to a source of reference potential, such as produced by power supply 120. The inverting inputs of amplifiers 64 and 63 are connected to receive the reference voltage produced at the junction of resistors 70 and 72. The non-inverting inputs of these amplifiers are coupled to the outputs from buffers 20 and 21. Whenever a voltage is detected from the buffers which exceeds the reference voltage, amplifiers 64 and/or 63 apply a relatively positive voltage to the base of transistor 66. The transistor is connected as a driver and, when rendered conductive by a positive voltage from amplifier 64 or 63, allows current to flow through LED 68, causing it to light and giving the desired warning. If no visual warning is desired, circuit interruption may be substituted for this warning circuit to provide similar overmodulation protection. If a more precise indication of overvoltage is needed, a voltage meter might be connected to the output of the buffers in place of circuit 60.

In operation, a stereophonic audio signal, comprising a right and a left channel, is applied to input terminals 10 and 11. As mentioned above, this signal may be derived from either a stereophonic amplifier or receiver, or any individual component of a stereophonic system such as a compact disc player, a tape deck, or a phonograph. As the operation of both right and left channels is virtually identical, with the exception of their different operating (or carrier) frequencies, only the operation of the right channel need be described.

Input terminal 10 supplies the right channel audio signal to input buffer 20 for amplification. The buffer is designed to present a high input impedance and a low output impedance to the signal, which allows the transmitter to operate without electrically loading the audio input device coupled to input terminal 10.

Warning circuit 60 detects if the buffer output signal is too high and would result in over modulation. If so, resistor 26 may be adjusted by an operator to reduce the audio signal level. Resistors 26 and 27 may be ganged for simultaneous adjustment. It is recognized that a high signal level applied to variable frequency oscillator 50 may cause the oscillator to over-modulate and produce a very distorted audio output. If the audio signal level is higher than the reference voltage established at the inverting input of operational amplifier 64, transistor 66 is turned "on" and current flows through the transistor and LED 68. In the present embodiment the reference voltage is set at about 700 mV. Of course, this threshold level can be altered to accommodate any modifications to the variable frequency oscillators which would enable them to accept higher input voltages. If the LED turns on, an operator may adjust resistors 26 and 27, thereby reducing the audio signal strength at the output of amplifiers 24 and 25, until LED 68 is turned "off".

The amplified audio signal from buffer 20 is applied to signal compressor 30. As mentioned above, the audio signal, especially if it is produced by a compact disc player, may have a very wide dynamic range, perhaps as much as 90 to 100 dB. It is desirable to reduce the dynamic range of the audio signal; and compressor 30 reduces the dynamic range by about one-half.

After being reduced in dynamic range, the audio signal is pre-emphasized by pre-emphasis network 40. The impedance of capacitor 42 decreases with an increase in frequency of the audio signal. Thus, lower frequency signals are reduced in strength relative to higher frequency signal because more of the lower frequency signal is attenuated by the higher apparent impedance of the network. By pre-emphasizing the higher frequencies of the audio signal, the effects of noise, which are greater with respect to higher frequencies than lower, can be compensated.

Once pre-emphasized, the audio signal is applied to variable frequency oscillator 50, where it is frequency modulated. As the embodiment being described is designed to function in a stereophonic fashion, oscillators 50 and 51 are designed to operate at two different frequencies. In the present embodiment the chosen carrier frequencies are 135 kHz for the right channel and 330 kHz for the left. The general band of frequencies from 100 to 400 kHz is selected because below 100 kHz, the impedance of the A.C. power lines is too low for sufficient coupling between the transmitter and the line, and above 400 kHz, the distributed inductances and capacitances of the A.C. power lines cause a large attenuation of the transmitted signal. The specific choice of carrier frequencies is dictated by the aforementioned constraints and the desire to avoid any interference between the channels. As 330 kHz is between the second (270 kHz) and third (405 kHz) harmonic of 135 kHz, interference between the channels is minimized. Other carrier frequencies may be selected, if desired.

The F.M. signal from oscillator 50 is applied to tuned output network 90 by common-emitter transistor 82 of amplifier 80. Network 90 is tuned to resonate at only the desired frequency for the channel, here 135 kHz. Thus only a sinusoidal signal with a frequency of 135 kHz is transferred to the secondary coil of transformer 92, and is applied by filter circuit 100 to output terminal 110 and thence to the A.C. wiring. It will be recognized that right and left channel signals of 135 KHz and 330 KHz are transmitted over the A.C. power lines.

RECEIVER SECTION

Figure 2:
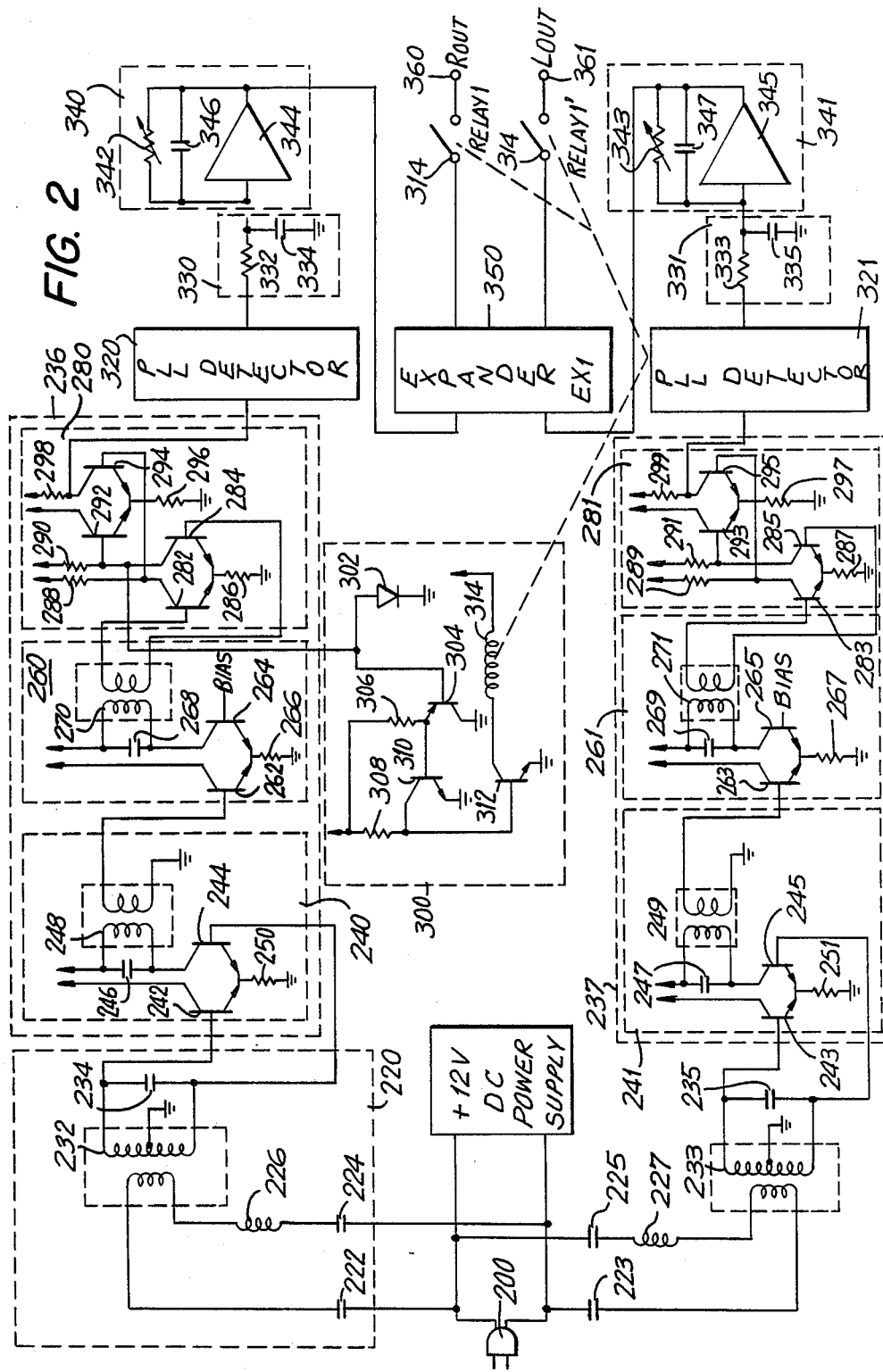
FIG. 2 is a schematic/block representation of the receiver section of the present invention.

As shown in FIG. 2, the receiving section is comprised of an input plug 200, input filter circuits 220 and 221, amplifier-filter stages 236 and 237. F.M. detectors 320 and 321, de-emphasis circuits 330 and 331, audio signal expander 350, and output terminals 360 and 361. As in the transmitter, elements designated by an even reference numeral are included in the right channel and elements designated by an odd reference numeral are included in the left channel. A circuit common to both channels is identified by an even reference numeral.

Input plug 200 couples the receiver to the A.C. wiring and is adapted to receive the transmitted F.M. signals. The input plug is also adapted to receive 120 v. A.C. power and deliver it to a power supply 210. The power supply is adapted to convert 120 v. A.C. to a 12 v. D.C. supply voltage to power the circuits included in the receiving section. The power supply is of conventional construction and operation, known to those skilled in the art, and may be similar to aforementioned power supply 120.

Input filter circuits 220 and 221 are coupled to input plug 200 and are each adapted to pass only their respective operating (carrier) frequency. Each filter is comprised of two stages. The first stage, comprised of capacitors 222, 224, 223 and 225 and inductors 226 and 227, respectively, is coupled to input plug 200 and is adapted to pass only high frequency signals. By so doing, the filters, which receive the F.M. signals from the A.C. power lines, prevent the A.C. power signal, which is usually 60 Hz, from flowing into the receiver. The second stage, comprised of center-tapped transformers 232 and 233 (whose center taps are connected to ground) and capacitors 234 and 235, respectively, is coupled to the first stage via the primary coils of transformers 232 and 233. The second stage forms a tuned resonant circuit and is thus adapted to filter out all signals except a sinusoidal signal with the desired resonant frequency. In this particular embodiment, the right channel filter 220 passes F.M. signals with a 135 kHz carrier frequency while the left channel filter 221 passes F.M. signals with a carrier frequency of 330 kHz. Although both stages of the filters have been constructed from capacitors and inductive elements, other filter constructions could be used with no alteration in function.

Amplifier-filter stages 236 and 237 are comprised of cascaded stages 240, 260, 280 and 241, 261, 281, respectively. Amplifier filter stages 240 and 241 are coupled to input filter-circuits 220 and 221, respectively, and are adapted to provide signal amplification and filtering. Although three pairs of amplifier-filter stages, 240 and 241, 260 and 261, 280 and 281, are present in this embodiment of the invention, other embodiments of this invention may use only two pairs of amplifier-filter stages, or only one.

Amplifier-filter stage 240 is comprised of a differential amplifier formed of transistors 242 and 244 and resistor 250. Amplifier-filter stage 241 likewise is formed as a differential amplifier. The differential amplifiers are conventional in construction and operation, known to one skilled in the art. Noise filtering is provided by using transformer 232 to apply the filtered source signal from input filter circuit 220 across the bases of both transistors in the differential amplifier. It has been found that noise signals appear to travel on both leads of the A.C. wiring which acts as the transmission medium for the F.M. signals supplied to the receiver; and these noise signals tend to be in phase with each other and of the same magnitude. Since differential amplifiers only amplify the difference between the signals applied to the bases of the transistors therein, applying the input signal to both bases in the differential amplifier results in the noise signals cancelling themselves out. The F.M. information signal, on the other hand, appears differentially across the leads of the A.C. wiring. Therefore, applying the received signal from transformer 232 to both sides of the differential amplifier results in differential amplification. Thus, the F.M. signal is amplified and noise is reduced. Additional filtering is provided by transformers 248 and 249 and capacitors 246 and 247 which respectively form tuned resonant circuits coupled to the differential amplifiers. These resonant circuits pass only a sinusoidal wave with the correct operating (carrier) frequency.

Amplifier-filter stages 260 and 261 are coupled to amplifier-filter stages 220 and 221, respectively, and are similarly adapted to provide amplification and filtering. The amplification is provided by the respective differential amplifiers, similar to those in stages 220 and 221, and the filtering is provided by tuned resonant circuits comprised of capacitors 268 and 269 and transformers 270 and 271 respectively.

Amplifier stages 280 and 281 are coupled to amplifier-filter stages 260 and 261, respectively, and are adapted to further amplify the F.M. signal. Each amplifier stage is illustrated as a pair of differential amplifiers and its filtering capacity derives from operating the amplifiers in a limited mode. This method of operation is described below.

F.M. detectors 320 and 321 are coupled to amplifier stages 280 and 281, respectively and are adapted to demodulate the F.M. signal, thereby providing an audio signal which can be used by any device requiring an audio input, such as loudspeakers or a magnetic tape recording/playback device. Preferably, detectors 320 and 321 are phase locked detectors well known to one familiar with the art. In one embodiment, the individual components 320 and 321, illustrated as "PLL Detectors," may be formed as, for example, phase locked loop chips such as R.C.A. Model CD 4046BE, although other conventional phase locked loops may be used.

De-emphasis circuits 330 and 331 are coupled to phase locked loop detectors 320 and 321 respectively. Each de-emphasis circuit is adapted to decrease the signal strength of the higher frequency components of the audio signal provided by the phase locked loops so as to counteract the pre-transmission boost of the high frequency components by pre-emphasis networks 40 and 41 (FIG. 1). Resistors 332 and 333 and capacitors 334 and 335 respectively comprise the de-emphasis circuits and are connected in series with one terminal of each capacitor coupled to ground potential. As the applied audio signal increases in frequency, the impedance of capacitors 334 and 335 decreases, whereby high frequency signals are increasingly shorted to ground. Thus, the relative strength of the high-frequency signals is decreased and residual high frequency operating (carrier) signals are also removed.

Variable low-pass filter circuits 340 and 341 are coupled to pre-emphasis circuits 330 and 331 and are adapted to filter out any residual operating (carrier) frequency signals from the audio signal. These residual operating (carrier) frequency signals could cause audio signal expander 350 to operate when no audio signal is present. Furthermore, since the output level produced by each phase locked loop detector 320 and 321 may differ, due to variation in manufacturing, filter circuits 340 and 341 are adapted to compensate for such difference to provide the correct audio signal level to signal expander 350. The filter circuits use variable resistors 342 and 343 and operational amplifiers 344 and 345 to provide the appropriate variable amplification.

Audio signal expander 350 is coupled to filter circuits 340 and 341 and is adapted to restore the original dynamic range of the audio signal. The compressor 30 (see FIG. 1) in the transmitter section reduced the dynamic range of the audio signal by about one-half, and expander 350 serves to double the dynamic range. In one embodiment, expander 350 may be formed as, for example, a compressor/expander chip such as Signetics Model NE 57ØN, although other convention signal expanders may be used.

Output terminals 360 and 361 are adapted to be coupled to the audio signal expander by way of relay contacts, described below. The terminals are adapted to connect the illustrated receiving section to a variety of output devices, such as stereophonic loudspeakers, stereophonic headphones, recording devices and the like. The terminals themselves are adapted to accept plug-in jacks, commonly called "banana" plugs, screw fasteners, or any conventional mechanical/electrical connection. In one embodiment a selector switch (not shown) enables a user to choose between output devices, in a manner obvious to one skilled in the art.

An output terminal disconnect circuit 300 is coupled to amplifier stages 280 and 281 and is adapted to energize a relay coil 314 to open and close relay contacts in the absence and presence of audio signals, respectively. The circuit, is comprised of transistors 304, 310 and 312, diode 302, resistors 306 and 308 and relay 314. By opening the relay contacts, output devices coupled to terminals 360 and 361 are disconnected from the receiver section in the absence of an audio signal, whereby undesirable hum and hiss in any output device is greatly reduced. Although this embodiment uses transistors as switches to deenergize relay 314, other methods of disconnecting the output devices could be used.

In the present embodiment both the left channel and right channel operate in a virtually identical fashion. Consequently only the operation of the right channel needs to be described.

Input plug 200 of the receiving section is inserted into an A.C. power outlet. This serves the dual purpose of energizing the illustrated circuits through power supply 210 and coupling any F.M. signals which might be received to the receiver section. When an F.M. signal is received, input filter circuit 220 removes the 60 Hz A.C. power signal but passes the F.M. signal. Since filter 220 is a high pass filter, other low frequency noise also is removed from the received information signal. Filter 230 is a resonant filter which resonates at the operating (carrier) frequency of 135 kHz. Only signals at that carrier frequency will be able to pass through filter 230. It is appreciated that signals having a carrier frequency of 330 kHz will pass through filter 231.

The output from filter circuit 230 is amplified by the differential amplifier in amplifier-filter stage 240. This differential amplifier operates in an unlimited fashion, meaning that all signals, both of high and low voltage, are amplified. As the receiver section can be placed anywhere in a house containing the transmitter unit, the received signal can vary in strength from millivolts to volts. To avoid either "losing" very small amplitude signals or reducing large amplitude signals, the amplifier operates in an unlimited fashion.

The tuned transformer circuit comprised of capacitor 246 and transformer 248 resonates at 135 kHz. Hence, only F.M. signals of that carrier frequency are coupled through transformer 248 to amplifier-filter stage 260. Amplification of the signal is achieved by the differential amplifier comprised of transistors 262 and 264. This amplifier also operates in an unlimited fashion to allow for variations in the strength of the received signals. Another resonant, tuned transformer circuit, comprised of transformer 270 and capacitor 268, provides additional filtering in the same manner as tuned transformer circuit 246 and 248.

After being further filtered and amplified by amplifier-filter 260, the signal is sampled by output terminal disconnect circuit 300. If a signal is present, relay 314 is energized and the output from audio signal expander 350 is coupled to output terminals 360 and 361 by the relay contacts. If no signal is present, relay 314 remains de-energized, the relay contacts are opened and the output terminals are disconnected. Thus, in the absence of a signal, no "hiss" or "hum" appears in the output devices.

More particularly, if a signal is present, diode 302 conducts to reduce the voltage at the base of transistor 304 to approximately zero. Thus, transistor 304 is turned off, whereby both the collector and base voltage of transistor 310 are equal. Hence, transistor 310 is non-conductive. Consequently, a relatively higher voltage is applied to the base of transistor 312, and it turns on, allowing energizing current to flow through relay coil 314. Should no signal be present, transistor 304 turns on which, in turn, turns on transistor 310 to reduce the voltage of the base of transistor 312. Transistor 312 thus is rendered non-conductive, leaving relay 314 de-energized.

Assuming an F.M. signal has been received, it is applied to amplifier stage 280 whereat it is amplified and filtered by the two differential amplifiers therein. The amplified F.M. signal then is applied to phase locked loop detector 320 which demodulates the F.M. signal and provides an audio signal output.

The audio signal is de-emphasized by de-emphasis circuit 330, filtered by low-pass filter 340, and then expanded to its original dynamic range by audio signal expander 350. Preferably, filter 340 is adjusted during assembly of the receiver section to insure that the signal level at the output of the filter is at the proper level for audio signal expander 350 to function correctly. This adjustment is done by means of variable resistor 342 which increases or diminishes the signal output from operational amplifier 346.

In audio signal expander 350, for every 1 dB range in the signal supplied thereto, a 2 dB range in the output signal is produced. The expanded, recovered audio signal then is applied to output terminal 360 by way of the closed relay contacts.

In a similar operation, the other channel of frequency-modulated audio information is amplified, filtered, demodulated and expanded to recover the original audio signal. This audio signal is supplied to output terminal 361.

While the present invention has been particularly shown and described with reference to a preferred embodiment, it will be readily appreciated by those of ordinary skill in the art that various changes and modification may be made. For example, if several transmitter units are operating on the same A.C. wiring system, a frequency change switch may be coupled to oscillators 50 and 51 to change the two carrier frequencies generated by these oscillators such that each transmitter operates with a distinctive set of carrier frequencies and allows non-interfering operation of the multiple transmitters. A similar adjustment may be made to F.M. detectors 320 and 321 to recover distinctive carrier frequencies. Also, an output selector switch might be coupled to output terminals 360 and 361 to enable the user to connect several output devices to his receiver section and then choose among them.

It is intended that the appended claims be interpreted as including the foregoing as well as other changes and modifications.

What is claimed is:

1. A transmitter for transmitting sterophonic audio signals over A.C. power lines, comprising:
   input means for providing first and second channels of stereophonic audio signals:
   a first signal processing channel including first input buffer means coupled to said input means for amplifying the first channel of stereophonic audio signals, first F.M. modulation means for modulating a first carrier with said first channel of stereophonic audio signals, and first coupling means for coupling said first F.M. modulation means to said first input buffer means;
   a second signal processing channel including second input buffer means coupled to said input means for amplifying the second channel of stereophonic audio signals, second F.M. modulation means for frequency modulating a second carrier with said second channel of stereophonic audio signals, and second coupling means for coupling said second F.M. modulation means to said second input buffer means;
   said first and second carriers exhibiting different frequencies, each being less than broadcast A.M. frequencies and the n-th harmonic of one frequency (n=1, 2, ...) being between the m-th and (m+1)th harmonics of the other frequency (m=1, 2, ...);
   first LC band-pass filter means coupled to said first F.M. modulation means and tuned to the frequency of said first carrier for supplying filtered signals to said A.C. power lines;
   second LC band-pass filter means coupled to said second F.M. modulation means and tuned to the frequency of said second carrier for supplying filtered signals to said A.C. power lines; and
   said first and second LC band-pass filter means including capacitance means for filtering the respective frequency modulated carrier applied thereto and for summing said frequency modulated carriers supplied to said A.C. power lines.

2. The transmitter of claim 1 wherein said first and second coupling means comprises audio signal compressor means for compressing the dynamic range of said stereophonic audio signals before applying said signals to said first and second F.M. modulation means.

3. The transmitter of claim 2 further comprising signal level detecting means for monitoring the voltage level of said stereophonic audio signals to indicate when said voltage level exceeds a threshold level.

4. The transmitter of claim 1 wherein said first and second F.M. modulation means comprise first and second voltage-controlled oscillators of different oscillating frequencies.

5. The transmitter of claim 3 wherein said first and second input buffer means comprise first and second variable gain amplifying means including adjustable means for changing the gain thereof to reduce the voltage level of said stereophonic audio signals below said threshold level.

6. The transmitter of claim 2 further comprising first and second pre-emphasis means coupled to said audio signal compressor means for pre-emphasizing the compressed stereophonic audio signals before applying same to said first and second F.M. modulation means.

7. A receiver for receiving stereophonic audio signals that are transmitted over A.C. power lines in the form of first and second frequency modulated carriers of different frequencies, each less than broadcast A.M. frequencies and harmonically non-related, said receiver comprising:
   input means coupled to the A.C. power lines for receiving the frequency modulated stereophonic audio signals;
   a first signal receiving channel including first band-pass filter means coupled to said input means and resonant at the first carrier frequency, first differential amplifier means coupled to said first band-pass filter means for cancelling noise signals present on said A.C. power lines, first plural-stage band-pass filter means coupled to said first differential amplifier means and resonant at said first carrier frequency, first output amplifier means coupled to said first plural-stage band-pass filter means for providing further amplification to the first frequency modulated carrier, and first phase locked loop detecting means coupled to said first output amplifier means for recovering the audio signals frequency modulated on said first carrier;
   a second receiving channel including second band-pass filter means coupled to said input means and resonant at the second carrier frequency, second differential amplifier means coupled to said second band-pass filter means for cancelling noise signals present on said A.C. power lines, second plural-stage band-pass filter means coupled to said second differential amplifier means and resonant at said second carrier frequency, second output amplifier means coupled to said second plural-stage band-pass filter means for providing further amplification to the second frequency modulated carrier, and second phase locked loop detecting means coupled to said second output amplifier means for recovering the audio signals frequency modulated on said second carrier; and output means coupled to said first and second phase locked loop detecting means for outputting recovered stereophonic audio signals.

8. The receiver of claim 7 further comprising output disconnect means for monitoring the presence of received F.M. signals and for disconnecting said output means when no F.M. signals are detected.

9. The receiver of claim 8 wherein said output disconnect means is coupled to at least one of said first and second output amplifier means for detecting the presence of F.M. signals and for disconnecting said output means from said first and second phase locked loop detecting means if no F.M. signals are detected.

10. The receiver of claim further comprising audio signal expander means coupled to said first and second phase locked loop detecting means for expanding the dynamic range of said stereophonic audio signals before applying said stereophonic audio signals to said output means.

11. The receiver of claim 10 further comprising first and second de-emphasis means for coupling said first and second phase locked loop means, respectively, to said output means.

12. The receiver of claim 10 further comprising first and second adjustable filter means for coupling said first and second phase locked loop means, respectively, to said output means.

* * * * *

UNITED STATES PATENT AND TRADEMARK OFFICE
CERTIFICATE OF CORRECTION

PATENT NO. : 4,829,570

DATED : May 9, 1989

INVENTOR(S) : Larry Schotz

It is certified that error appears in the above-identified patent and that said Letters Patent is hereby corrected as shown below:

In the Claims:

Claim 10, column 14, line 1, after "claim" insert -- 9 --.

Signed and Sealed this

Twentieth Day of February, 1990

*Attest:*

JEFFREY M. SAMUELS

*Attesting Officer*     *Acting Commissioner of Patents and Trademarks*